(12) United States Patent
Chen et al.

(10) Patent No.: US 7,792,074 B2
(45) Date of Patent: Sep. 7, 2010

(54) METHOD AND APPARATUS FOR CHANNEL MANAGEMENT FOR POINT-TO-MULTIPOINT SERVICES IN A COMMUNICATION SYSTEM

(75) Inventors: Tao Chen, San Diego, CA (US); Jun Wang, San Diego, CA (US); Edward G. Tiedemann, Jr., Concord, MA (US)

(73) Assignee: Qualcomm Incorporated, San Diego, CA (US)

( * ) Notice: Subject to any disclaimer, the term of this patent is extended or adjusted under 35 U.S.C. 154(b) by 1982 days.

(21) Appl. No.: 10/113,098

(22) Filed: Mar. 28, 2002

(65) Prior Publication Data

US 2002/0181423 A1 Dec. 5, 2002

Related U.S. Application Data

(60) Provisional application No. 60/279,970, filed on Mar. 28, 2001.

(51) Int. Cl.
*H04W 4/00* (2009.01)
*H04W 72/00* (2009.01)
*H04B 7/00* (2006.01)

(52) U.S. Cl. .................. 370/329; 370/341; 455/450; 455/519

(58) Field of Classification Search .......... 370/312, 370/389, 390, 432, 524, 329, 335, 437; 455/450, 455/512, 13.2, 519, 516

See application file for complete search history.

(56) References Cited

U.S. PATENT DOCUMENTS

| 4,901,307 | A |  | 2/1990 | Gilhousen et al. |
| 5,056,109 | A |  | 10/1991 | Gilhousen et al. |
| 5,103,459 | A |  | 4/1992 | Gilhousen et al. |
| 5,235,631 | A | * | 8/1993 | Grube et al. ............ 455/509 |
| 5,365,572 | A | * | 11/1994 | Saegusa et al. .......... 455/463 |
| 5,504,773 | A |  | 4/1996 | Padovani et al. |
| 5,881,368 | A |  | 3/1999 | Grob et al. |
| 5,884,196 | A |  | 3/1999 | Lekven et al. |
| 5,970,417 | A | * | 10/1999 | Toyryla et al. .......... 455/519 |
| 5,983,099 | A |  | 11/1999 | Yao et al. |
| 6,006,073 | A |  | 12/1999 | Glauner et al. |
| 6,058,289 | A | * | 5/2000 | Gardner et al. ......... 340/7.32 |
| 6,385,461 | B1 | * | 5/2002 | Raith ..................... 455/518 |

(Continued)

FOREIGN PATENT DOCUMENTS

EP 0993128 4/2000

(Continued)

OTHER PUBLICATIONS

International Search Report—PCT/US02/009827, International Search Authority—European Patent Office, Aug. 16, 2002.

(Continued)

*Primary Examiner*—Hanh Nguyen
(74) *Attorney, Agent, or Firm*—Pavel Kalousek; John J. Ketchum

(57) ABSTRACT

To enable both point-to-multipoint and point-to-point communication services in an existing cellular communication system infrastructure, a apparatus and system for channel management and overhead functions associated with use of the assigned channels for point-to-multipoint services in the cellular communication system infrastructure are described.

32 Claims, 1 Drawing Sheet

U.S. PATENT DOCUMENTS

| | | | |
|---|---|---|---|
| 6,473,419 B1 * | 10/2002 | Gray et al. | 370/349 |
| 6,529,740 B1 * | 3/2003 | Ganucheau et al. | 455/13.2 |
| 6,539,242 B1 * | 3/2003 | Bayley | 455/574 |
| 6,577,848 B1 * | 6/2003 | Gregg et al. | 455/13.2 |
| 6,728,226 B1 | 4/2004 | Naito | |
| 6,731,936 B2 | 5/2004 | Chen et al. | |
| 6,804,520 B1 * | 10/2004 | Johansson et al. | 455/450 |
| 6,831,910 B1 | 12/2004 | Moon et al. | |
| 6,920,119 B2 * | 7/2005 | Rinchiuso | 370/329 |
| 6,978,143 B1 * | 12/2005 | Vialen | 455/452.2 |
| 6,983,410 B2 | 1/2006 | Chen | |
| 6,987,982 B2 * | 1/2006 | Willenegger et al. | 455/515 |
| 7,133,353 B2 | 11/2006 | Sourour et al. | |
| 2001/0036200 A1 | 11/2001 | Nelson et al. | |
| 2003/0134655 A1 * | 7/2003 | Chen et al. | 455/522 |

FOREIGN PATENT DOCUMENTS

| | | |
|---|---|---|
| EP | 0999656 | 5/2000 |
| EP | 1143635 | 10/2001 |
| WO | 9810604 | 3/1998 |
| WO | 9825422 | 6/1998 |
| WO | 9922466 | 5/1999 |
| WO | 9966657 | 12/1999 |
| WO | 0074311 | 12/2000 |
| WO | 0120805 | 3/2001 |

OTHER PUBLICATIONS

International Preliminary Examination Report—PCT/US02/009827, IPEA/US—Alexandria, Virginia, Dec. 18, 2002.

* cited by examiner

METHOD AND APPARATUS FOR CHANNEL MANAGEMENT FOR POINT-TO-MULTIPOINT SERVICES IN A COMMUNICATION SYSTEM

CROSS REFERENCE

This application claims priority from Provisional Application No. 60/279,970, filed Mar. 28, 2001, entitled "METHOD AND APPARATUS FOR GROUP CALLS USING DEDICATED AND COMMON CHANNELS IN WIRELESS NETWORKS."

BACKGROUND

1. Field

The present invention relates to point-to-multipoint services, in a wireline or a wireless communication system. More specifically, the present invention relates to a method and an apparatus for channel management in such a point-to-multipoint services in a communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber terminals requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. Likewise, the communication can be conducted between a first user on a mobile subscriber station and a second user on a landline station. A base station receives the data from the user on a reverse link, and routes the data through a public switched telephone network (PSTN) to the second user.

The above described wireless communication service is an example of a point-to-point communication service. In contrast, a point-to-multipoint service is a service where information provided by a source of the information is intended for a plurality of users. The basic model of a point-to-multipoint communication system comprises a set of users on subscriber stations, a group of which receives information from one or more sources of information via a wireline or wireless network. In a point-to-multipoint service, in which the source fixedly determines the information content, e.g., news, movies, sports events and the like, the users are generally not communicating back. To save resources, in general, each user's subscriber station participating in the point-to-multipoint service (a member subscriber station) monitors a shared channel modulated by the information. Such a point-to-multipoint service is also referred to as broadcast or multicast, examples of common usage of which comprise TV broadcast, radio broadcast, and the like. Alternatively, the source of information is a user, a member of the group, which transmits information intended for the remaining members of the group. If the user wishes to talk, he presses a push to talk (PTT) button. Typically, the talking user's voice is routed from the subscriber station to the network on a dedicated reverse link channel. The network then transmits the talking user's voice over a forward link shared channel. As in case of the point-to-point communication system, such a communication system allows both landline and wireless subscriber station to access the system. Such a point-to-multipoint service is also referred to as a group service. Examples of the group service communication system use is in dispatch services, such as local police radio systems, taxicab dispatch systems, Federal Bureau of Intelligence and secret service operations, and general military communication systems.

The above-mentioned point-to-multipoint service communication systems are generally highly specialized purpose-build communication systems. With the recent, advancements in wireless cellular telephone systems there has been an interest of utilizing the existing infrastructure of the— mainly point-to-point cellular telephone systems—for point-to-multipoint services. As used herein, the term "cellular" system encompasses system operating on both cellular and personal communication system (PCS) frequencies.

As discussed, to save resources, in general, the point-to-multipoint services rely on assigning a shared forward link channel to be monitored by all the member users. In contrast, the wireless cellular telephone systems assign a dedicated forward and reverse link channels between a base station or sector whose coverage area contains users wishing to communicate. Because of the limited number of such dedicated forward and reverse link channels that can be supported by a wireless cellular telephone system, the number of members who could participate in a point-to-multipoint service provided over dedicated forward and reverse link channels is limited. Furthermore, it is required that both group services and telephone services are enabled in a wireless cellular telephone systems. Therefore, there is a need in the art for a method and apparatus for such a channel management that enables both group services and telephone services utilizing an existing infrastructure of a wireless cellular telephone system.

SUMMARY

In one aspect of the invention, the above stated needs are addressed by channel management in a communication system, comprising assigning to each subscriber station belonging to a group a shared forward channel during an active period; and assigning to each subscriber station belonging to a group a forward channel during a silent period.

In another aspect of the invention, the above stated needs are addressed by channel management in a communication system, comprising assigning to each subscriber station belonging to a group a dedicated reverse channel during an active period; modulating by an active subscriber station belonging to the group the dedicated reverse channel by user data and control data; and modulating by passive subscriber station belonging to the group the dedicated reverse channel by control data.

In yet another aspect of the invention, the above stated needs are addressed by modulating a reverse link channel by a request to transmit by a subscriber station belonging to a group; and receiving over a forward link channel monitored by the subscriber station a response to the request to transmit. The reverse link channel used and the forward link channel monitored by the subscriber station depends on a state of a point-to-multipoint service activity, e.g., a silent and active period. The response may comprise a reverse link channel assignment and explicit permission to transmit.

In yet another aspect of the invention, the above stated needs are addressed by assigning different forward links to be monitored and reverse links to be used by member mobile stations in accordance with the point-to-multipoint service activity, e.g., a silent and active period.

DETAILED DESCRIPTION

Definitions

Figure 1:
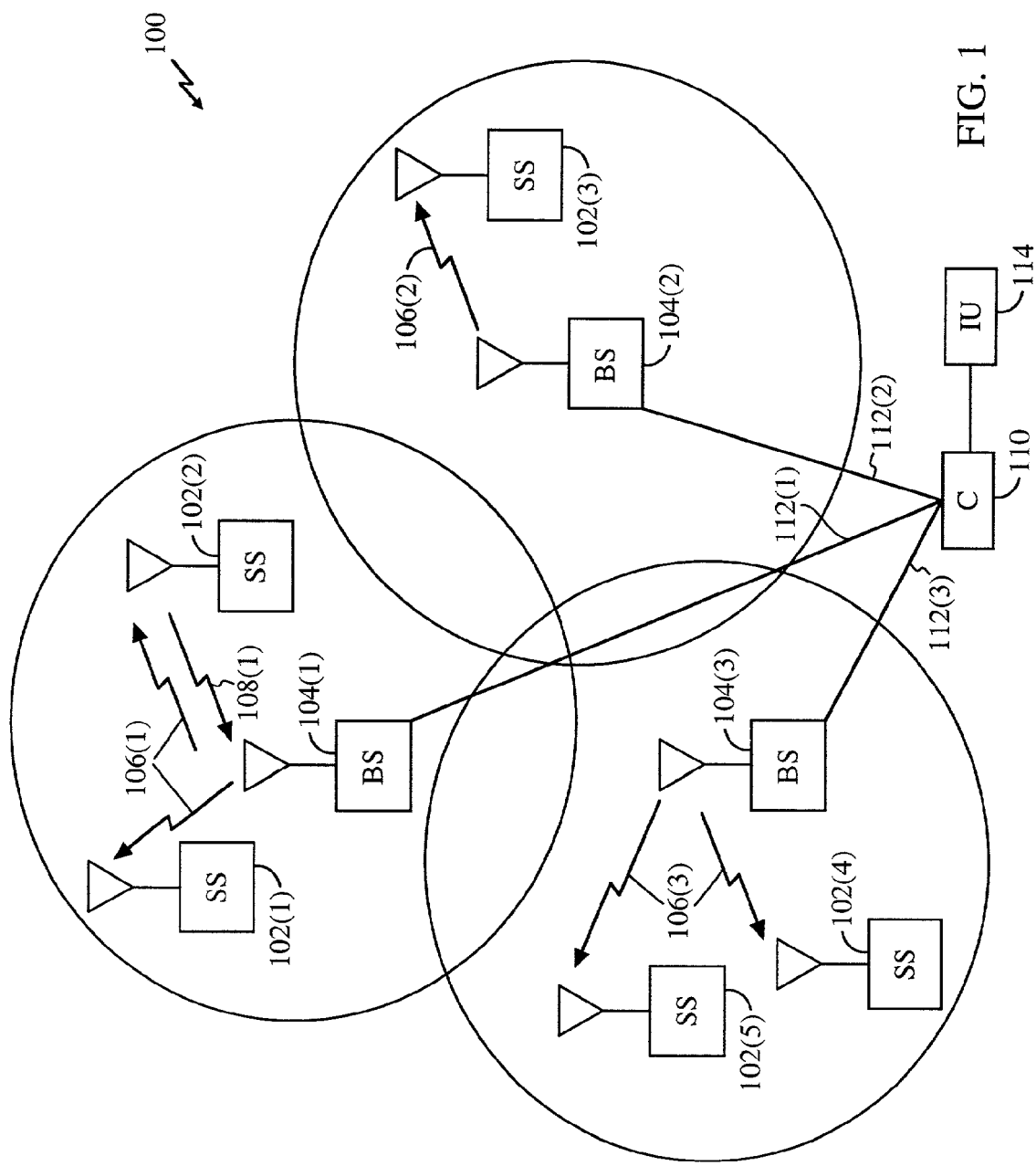
FIG. 1 illustrates a conceptual diagram of a point-to-multipoint service communication system.

The word "exemplary" is used exclusively herein to mean "serving as an example, instance, or illustration." Although a best mode embodiment is contained herein, an embodiment described as "exemplary" is not necessarily to be construed as preferred or advantageous over other embodiments.

The terms point-to-point communication is used herein to mean a communication between two subscriber stations over a dedicated forward communication channel and dedicated reverse communication channel.

The term point-to-multipoint communication service is used herein to mean a communication wherein a plurality of subscriber stations are receiving communication from—typically—one source. Such services may comprise, e.g., group service, in which the source is a subscriber station; a broadcast service, in which the source is a central station; or a multicast service, in which the recipients comprise a sub-set of the plurality of subscriber stations.

The term access network is used herein to mean a collection of base stations and one or more base stations' controllers. The access network transports data between multiple subscriber stations. The access network may be further connected to additional networks outside the access network, such as a corporate intranet or the Internet, and may transport data between each access terminal and such outside networks.

The term base station is used herein to mean the hardware with which subscriber stations communicate. Cell refers to the hardware or a geographic coverage area, depending on the context in which the term is used. A sector is a partition of a cell. Because a sector has the attributes of a cell, the teachings described in terms of base stations/cells are readily extended to sectors.

The term subscriber station is used herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state.

The term physical channel is used herein to mean a communication route over which a signal propagates described in terms of modulation characteristics and coding.

The term logical channel is used herein to mean a communication route within the protocol layers of either the base station or the subscriber station.

The term communication channel/link is used herein to mean a physical channel or a logical channel in accordance with the context.

The term reverse channel/link is used herein to mean a communication channel/link through which the subscriber station sends signals to the base station.

A forward channel/link is used herein to mean a communication channel/link through which a base station sends signals to an subscriber station.

The term soft hand-off is used herein to mean a communication between a subscriber station and two or more sectors, wherein each sector belongs to a different cell. The reverse link communication is received by both sectors, and the forward link communication is simultaneously carried on the two or more sectors' forward links.

The term softer hand-off is used herein to mean a communication between a subscriber station and two or more sectors, wherein each sector belongs to the same cell. The reverse link communication is received by both sectors, and the forward link communication is simultaneously carried on one of the two or more sectors' forward links.

The term puncture is used herein to mean replacing a first information content of a first size with a second information content of a first size.

The term dedicated channel is used herein to mean a channel modulated by information specific to an individual subscriber station.

The term common channel is used herein to mean a channel modulated by information shared among all subscriber stations.

The term user data or payload is used herein to mean data other than control data.

The term control data is used herein to mean data enabling operation of entities in a communication system. Control data comprise, e.g., call maintenance signaling, diagnostic and reporting information, and the like.

Description

FIG. 1 illustrates a conceptual diagram of a communication system 100 capable of providing point-to-multipoint services in accordance with embodiments of the present invention. For tutorial purposes, the following description illustrates a group service; however, one of ordinary skills in the art understands how to apply the disclosed concepts to other point-to-multipoint services. A (calling) group is defined by the group's membership, comprising users of subscriber stations talking to one another frequently enough to establish the calling group. The calling group is said to be in a sleep state when no member is either idle or active, e.g., all members either do not participate in the calling group or powered off their subscriber stations. The calling group is in the idle state when at least one member participates in the group. The calling group is in the active state when one of at least two members initiates a group call. A group call is divided into active and silent periods. The group call is in the active period when there are transmissions between the members without long idle periods. The group call is in a silent period when there is no member transmitting any traffic for a period extending the long idle period.

In an active period, a group user on a subscriber station, e.g., subscriber station 102(1) communicates user information (voice or data) to other group users on subscriber stations 102(2) through 102(5) via an access network comprising base stations 104 and a controller 110. For brevity, the term "member subscriber station" is used hereinafter to mean "group user on a subscriber station" unless stated otherwise. The base stations 104 are connected to the controller 110 by backhauls 112. The term backhaul is used to mean a communication link between a controller and a base station. The backhaul 112 can be implemented in a number of connection types including, e.g., a microwave or wire-line E1 or T1, optical fiber, and other connection types known to one of ordinary skills in the art. The controller 110 is connected to an interface unit 114, interfacing the communication system 100 with other services (not shown), e.g., a public switched telephone network (PSTN), packed data serving node (PDSN), and other services known to one of ordinary skills in the art.

When a member subscriber station, e.g., the subscriber station 102(1), desires to transmit user data to the group over the reverse link, the member subscriber station needs to request an assignment of a reverse link and permission to transmit. A control unit located at the individual sector, at a base station comprising the sector, at the controller, or any other element comprising the access network, is responsible for the channel assignment. The member subscriber station is then provided the assignment via a forward link channel monitored by the subscriber station. The reverse link is divided into reverse link channels. Once the member subscriber station 102(1) is assigned a reverse link channel 108(1), the subscriber station 102(1) may transmit information to a base station 104(1). Such a transmitting member subscriber station is referred to as an active member or a talker. The base station 104(1) routes the received information to base stations 104(2) and 104(3), and transmits the received information on a forward link shared channel 106(1) to the subscriber station 102(2). The base stations 104(2) and 104(3) transmit the routed information on the forward link shared channels 106(2) and 106(3). To receive the information from the active member subscriber station 102(1), all the member subscriber stations of an active group, i.e., the subscriber stations 102(1) through 102(5) are assigned to monitor the forward link shared channel(s) 106 of their individual base stations 104 during active group calls. In general, the forward link shared channels 106(1), 106(2), and 106(3) assigned by the respective base stations or 104(1), 104(2), and 104(3) are different from one another. However, to allow improved reception of member subscriber stations 102 located in overlapping coverage areas, the forward link shared channel 106 may be transmitted synchronously by more than one sector or base station 104. The method for improved reception of the forward link common shared channel in overlapping coverage areas is disclosed in co-pending application Ser. No. 09/933,607, entitled "METHOD AND SYSTEM FOR A HANDOFF IN A BROADCAST COMMUNICATION SYSTEM," filed Aug. 20, 2001, assigned to the assignee of the present invention. One of ordinary skills in the art recognizes that a base station serving an area can be sectorized. Consequently, the term sector and base station are used interchangeably, unless expressly specified otherwise.

In one embodiment, the forward link shared channel 106 is modulated by the user information intended to the member subscriber stations, and control data, e.g., signaling information, power control information, and other types of information necessary for operation of the entities of the communication system known to one skilled in the art. However, the limited capacity a forward link shared channel may prevent modulation by both the call information and the call maintenance information. Consequently, in another embodiment, only the user information is transmitted on the forward link shared channel 106, and the control data may be modulated on an additional forward link channel, hereinafter referred to as control/signaling forward link channel. In that case, each member subscriber station 102 must monitor, in addition to the forward link shared channel, the control/signaling forward link channels. Such an control/signaling channel may be a dedicated channel or a common channel.

When the active period ends, i.e., the member subscriber station 102(1) finishes communication and no other member subscriber station 102 initiates communication for a first determined time interval, a silent period begins. To reduce capacity waste, the member subscriber stations 102 cease monitoring the forward link shared channel 106, and the control/signaling forward link channels if monitored, and start monitoring a determined forward link channel, thus transitioning into a dormant state. In one embodiment, transmission of the forward link shared channel 106 can cease. The term dormant state is used herein to mean a state from which the member subscriber stations 102 transitions to the forward link shared channel monitoring in accordance to a pre-determined procedure. Such a pre-determined procedure may be implemented as a state machine. After a second determined time interval of no group communication activity, the member subscriber stations 102 transition from the dormant state into an idle state. In the idle state, the member subscriber stations 102 monitor a determined forward link channel, but a transition to the forward link shared channel monitoring is carried out in accordance to a predetermined procedure different from the pre-determined procedure for transitioning to the forward link shared channel monitoring from the dormant state. Additionally, if the member subscriber stations 102 know that the group call ended, the member subscriber stations 102 can transition directly to the idle state. In another embodiment, the member subscriber stations 102 are instructed by a control entity via base stations 104 to transition to an appropriate state.

When the silent period ends and an active period begins, the member subscriber stations 102 transition from the dormant or idle state back to the forward link shared channel 106. The member subscriber stations 102 are notified about the start of the active period by signaling messages transmitted via the base stations 104 on the forward link channels monitored by the member subscriber stations 102 in the dormant or idle state.

An application of the above-described concepts is explained in further details below for a communication system in accordance with IS-2000 standard.

Although channels specific to the communication system in accordance with IS-2000 standard are used in the following text for tutorial purposes, one of ordinary skills in the art will be able to extend the above-described concepts to channels of communication systems in accordance with other standards.

Forward Link Channel Assignment

To maximize capacity and minimize power while allowing multiple users receive user communication (voice or data), members of an active group are assigned a forward link shared channel of their individual sectors during active group calls, i.e., the member subscriber stations are provided with information allowing the member subscriber station to receive data modulated on the forward link shared channel. In one embodiment, in a communication system in accordance with the IS-2000 standard, the forward link shared channel comprises a Forward Supplemental Channel (F-SCH), which is modulated by both the user data and the control data, and is shared by the member subscriber stations in a coverage area of the sector. When a member subscriber station joins an active group, a control entity via an appropriate sector assigns the member subscriber station to monitor (demodulate) the shared F-SCH(s) for a finite or an infinite duration. Such assignment accomplished by sending an assignment message on the channel, which the subscriber station monitors while in an idle or a dormant state. The shared FSCH(s) may operate in a fixed-rate mode for simplicity or a variable-rate mode for more flexibility. The term variable mode is used herein to mean that a data rate can change within an agreed-upon set of rates of data without notification.

Once the member subscribe station is monitoring the F-SCH(s), control data necessary to maintain the call, e.g., a pilot strength measurement message, handoff direction message, handoff completion message, and other messages known to one of ordinary skills in the art, and control data related to the group call may also be send on the F-SCH(s). The messages related to the group call may comprise, e.g., a start and an end of the group call, request and grant of a right to transmit, and other messages known to one of ordinary skills in the art. Because the F-SCH(s) is a shared channel, proper member subscriber station addressing information must be employed, so that the member subscriber station can discern shared information directed to all member subscriber stations from dedicated information directed to a particular member subscriber station. The control data messages and the overhead of member subscriber stations addressing negatively affects the user data bearing capacity of the F-SCH. Therefore, alternatively, the control data messages are carried on control/signaling forward link channel(s).

In one embodiment, the control/signaling forward link channel, which the control entity via a sector assigns to each individual member subscriber station, in a communication system in accordance with the IS-2000 standard, comprises a Forward Dedicated Control Channel (F-DCCH). In addition to other control data messages, the F-DCCH can also be modulated by reverse link power control commands controlling transmission power level of a member subscriber station transmitting on a reverse link channel. The power control commands comprise a Forward Power Control Sub-channel (F-PCSCH), which is punctured into the F-DCCH. The term punctured is used herein to mean sending a reverse link power control command in place of a F-DCCH command. When there is no signaling load on the F-DCCH, only the F-PCSCH is transmitted, thus little power and capacity is consumed. However, other power control methods for a point-to-multipoint services communication system as disclosed in a co-pending application Ser. No. 10/113,257, entitled "POWER CONTROL FOR POINT-TO-MULTIPOINT SERVICES PROVIDED IN COMMUNICATION SYSTEMS," filed Mar. 28, 2002, assigned to the assignee of the present invention are contemplated.

Alternatively, the control/signaling forward link channel, which the control entity via a sector assigns to each individual member subscriber station, in a communication system in accordance with the IS-2000 standard, comprises a Forward Common Control Channel (F-CCCH), a Forward Broadcast Channel (F-BCCH), or a combination of the F-CCCH and the F-BCCH. Consequently, the signaling messages for the member subscriber station are modulated on the F-CCCH/F-BCCH. Additionally, reverse link power control commands controlling transmitting power level of a member subscriber station transmitting of a reverse link channel can be modulated on a Forward Common Power Control Channel (F-CPCCH). When there is no signaling load on the F-CCCH/F-BCCH, only the F-CPCCH is transmitted, thus a little power and capacity is consumed. Use of the F-CPCCH is disclosed in the above-mentioned co-pending application Ser. No. 10/113,257, entitled "POWER CONTROL FOR POINT-TO-MULTIPOINT SERVICES PROVIDED IN COMMUNICATION SYSTEMS," filed Mar. 28, 2002, assigned to the assignee of the present invention.

The member subscriber station may inform the transmitting sector about the quality of service (QoS). Thus, in one embodiment, when the common information modulating the forward link shared channel is received in error, the member subscriber station may inform the transmitting sector about the error, and the information may be re-transmitted. In a communication system in accordance with the IS-2000 standard, the Reverse Enhanced Access Channel (R-EACH) can be used for the QoS reporting. In one embodiment, the re-transmissions take place on the forward link shared channel. In another embodiment, the re-transmissions take place on the control/signaling forward link channel assigned to the member subscriber station, e.g., F-DCCH, F-CCCH, F-BCCH. This is feasible when the time delay and delay variation caused by the retransmission are tolerable for the application. Detail on retransmission are disclosed in a co-pending application Ser. No. 09/1989,347, filed Jul. 2, 2001, entitled "SYSTEM AND METHOD FOR FRAME RE-TRANSMISSION IN A BROADCAST COMMUNICATION SYSTEM," assigned to the assignee of the present invention.

In another embodiment, the forward link shared channel comprises an F-CCCH, an F-BCCH, or the combination of the F-CCCH and the F-BCCH. The member subscriber stations may share the F-CCCHs and the F-BCCHs for group calls, while the non-member subscriber stations monitor the F-CCCHs and the F-BCCHs for paging. The F-CCCH(s) and the F-CCCH(s) assigned for group calls can operate in a fixed-rate mode for simplicity or a variable-rate mode for more flexibility. Because the F-CCCH and the F-BCCH are common channels, proper subscriber station addressing information must be employed, so that a subscriber station can discern the shared information intended for member subscriber stations from information directed to an individual subscriber station.

To avoid the addressing overhead, in one embodiment, the F-CCCHs and the F-BCCHs may be divided so that some of the F-CCCHs and the F-BCCHs in a sector are designated as forward link shared channels for member subscriber stations for point-to-multipoint services, and the remaining F-CCCHs and F-BCCHs are designated exclusively for paging of the non-member subscriber stations.

As discussed, the signaling messages and the overhead of subscriber station addressing negatively affects the traffic capacity of the forward link shared channel(s), therefore, alternatively, the signaling messages are carried on an control/signaling forward link channel. Consequently, when some of the F-CCCHs and the F-BCCHs in a sector or base station are assigned as forward link shared channels for the point-to-multipoint services, an additional F-CCCH and a forward Quick Paging Channel (F-QPCH) associated with the additional F-CCCH may be utilized for paging, and an additional F-BCCH may be utilized for point-to-multipoint service signaling. Member subscriber stations continuously monitor the F-CCCH(s) and the F-BCCH(s) assigned to the group as forward link shared channels and the signaling F-BCCH. Furthermore, each member subscriber station is assigned to monitor a slot on the F-QPCH to decide whether there is a need to monitor the F-CCCH associated with the F-QPCH for paging information. Such a use of F-QPCH and associated F-CCCH is fully described in the IS-2000, thus known to one of ordinary skills in the art.

When an active member subscriber station communicates with the base station, in one embodiment the reverse link power commands are transmitted on the forward link shared channels, i.e., the F-CCCH/F-BCCH. In another embodiment, the reverse link power commands both for the member subscriber stations and non-member subscriber stations are modulated on a F-PCSCH. To properly interpret the reverse link power commands, each individual subscriber station monitors a different sub-stream of the power control commands on the F-PCSCH assigned to the subscriber station. Alternatively, some of the F-PCSCHs in a sector or base station are assigned for member subscriber stations only, while other F-CPCCHs are designated for non-member subscriber stations. Again, each individual subscriber station is assigned to monitor a different sub-stream of power control commands on the assigned F-PCSCHs. Use of the F-CPCCH is disclosed in the above-mentioned co-pending application Ser. No. 10/113,257, entitled "POWER CONTROL FOR POINT-TO-MULTIPOINT SERVICES PROVIDED IN COMMUNICATION SYSTEMS," filed Mar. 28, 2002, assigned to the assignee of the present invention.

The member subscriber station may inform the transmitting sector about the quality of service (QoS). Thus, in one embodiment, when the common information modulating the forward link shared channel F-CCCH(s) or F-BCCH(s) is received in error by a member subscriber station, the member subscriber station may used a reverse enhanced access channel (R-EACH) to inform the transmitting sector about the error, and the information may be re-transmitted. Re-transmissions can take place on the group call F-CCCH(s) or F-BCCH(s). Re-transmission is feasible when the time delay and delay variation caused by the retransmission are tolerable for the application. Detail on retransmission are disclosed in the above-cited co-pending application Ser. No. 09/898,347, filed Jul. 2, 2001, entitled "SYSTEM AND METHOD FOR FRAME RE-TRANSMISSION IN A BROADCAST COMMUNICATION SYSTEM", assigned to the assignee of the present invention.

Reverse Link Channel Assignment

As discussed above, in general, only one member subscriber station transmits on a reverse link at one time. Consequently, although the passive member subscriber stations do not transmit user data over reverse link any of the sectors, the passive member subscriber stations may need to use a reverse link to communicate to the sectors information necessary for call maintenance, e.g., handoff messages, power control, and other information known to one of ordinary skills in the art. The term passive is used herein to mean a member subscriber station monitoring a forward link shared channel, and any control/signaling forward link channel necessary for group call, but not transmitting user data on a reverse link channel. Furthermore, the passive member subscriber station may desire to communicate some data; therefore, the passive member subscriber station needs means for requesting a reverse traffic channel assignment. Consequently, the passive member subscriber stations may need to be assigned reverse link channels.

In accordance with one embodiment, the control entity via a sector assigns to each individual member subscriber station a reverse dedicated channel, which, in a communication system in accordance with the IS-2000 standard comprises a Reverse Dedicated Control Channel (R-DCCH), upon joining an active group. The passive member subscriber stations use the R-DCCH for transmitting control data for regular calls (e.g., reporting of forward link pilots), and transmitting control data related to the group call (e.g., quality metric reporting of forward link broadcast channel, request for a reverse link traffic channel assignment.) The active member station further uses the R-DCCH for transmitting user data. When transmitting the R-DCCH, the member subscriber station also transmits a Reverse Pilot Channel (R-PICH) and a Reverse Power Control Subchannel (R-PCSCH). The R-PCSCH carries feedback on a quality metric of the forward link shared channel.

Because the R-DCCH is modulated by control data only, there are periods, in which there is no need to transmit such information. Consequently, the passive member subscriber station may cease to transmit the R-DCCH, and transmit only the R-PICH multiplexed with the R-PCSCH. Such mode of operation is described in the IS-2000 standard.

If the periods of inactivity exceeds a pre-determined interval, further reduction in power and capacity consumption may be achieved by gating the R-PICH/R-PCSCH. The term gating as used herein means activating transmission of the R-PICH/R-PCSCH only in pre-determined power control groups (PCG). Additionally, as the frequency of power measurement at the sectors decreased because the need for precise reverse link power control becomes less important, the data rate on the corresponding sub-stream on the F-CPCCH carrying the reverse control power commands is reduced. The rate reduction on the F-CPCCH is achieved by assigning the gated member subscriber station to a lower rate sub-stream the F-CPCCH, or by sharing a higher rate sub stream by multiple gated member subscriber stations.

Furthermore, if there is no need to transmit the power control commands, the transmission of the R-PCSCH can be discontinued because in accordance with the IS-2000 standard, the he only necessary transmission from the subscriber station is the R-PICH, i.e., the R-PICH is sent continuously without the multiplexed R-PCSCH. Additionally, the transmission on the R-PICH/R-PCSCH can be stopped altogether. This results in stopping the sub-stream on the corresponding F-CPCCH.

Furthermore, a combination of the two methods may be used. In such a method, the member subscriber station starts the gated R-PICH/R-PCSCH transmission after a first inactivity interval, and stops the R-PICH/R-PCSCH transmission after a second inactivity interval. The data rate of the corresponding F-CPCCH is reduced correspondingly.

If the member subscriber station needs to transmit control data signaling messages to a sector during the gated or stopped mode on the R-DCCH, a transmission of a first signaling message terminates the gating, i.e., the R-PICH, R-PCSCH, and the R-DCCH are continuously activated during the signaling message. Once the signaling messages has been sent, the subscriber station reverts to the gated or stopped mode as described above. Furthermore, to assist the sector in acquiring the subscriber station signal, the R-PICH can be activated ahead of the R-DCCH message, possibly at an elevated power level, as a preamble.

In an alternative embodiment, only the active member subscriber station is assigned a dedicated reverse link channel, e.g., R-DCCH. The passive member subscriber stations are not assigned dedicated reverse link channels. Instead, the passive member subscriber stations use a reverse enhanced access channel R-EACH for reverse link signaling when needed, using basic access, reservation access, and power control access. The basic access, reservation access, and power control access are defined in the IS-2000 standard, therefore, well known to one of ordinary skills in the art.

According to the basic access mode, the member subscriber station randomly selects a R-EACH, and transmits a pre-amble with increased power on the R-PICH, followed by the message on the R-EACH. The member subscriber station then monitors the forward link shared channel for acknowledgement, and starts transmission on the R-EACH upon reception of the acknowledgement.

According to the reservation access, the member subscriber station randomly selects a R-EACH, and transmits a short header to a sector on the REACH to reduce the probability of collision with other access attempts on the REACH, which might result in loss of the access attempt. The sector sends an Early Acknowledgement Channel Assignment Message (EACAM) on a Forward Common Assignment Channel (F-CACH) to assign a reverse common control channel (R-CCCH) to the member subscriber station. The member subscriber station then monitors the forward link shared channel for the EACAM, and starts transmission on the R-CCCH upon reception of the EACAM.

In another embodiment, a member subscriber station transmit on a REACH in a Power Controlled Access Mode (PCAM). In the PCAM, the access procedure is similar to the reservation access and the transmission on the REACH is power controlled by designated power control bits sent by base station upon acquisition of the R-EACH on the Forward Common Power Control Channel (F-CPCCH).

Transmission to the Group

When a member subscriber station desires to transmit voice or data to the group, the member subscriber station needs to be assigned a reverse channel and receive permission to transmit.

As discussed, in one embodiment, each member subscriber station is assigned a reverse link channel for transmitting control data, e.g., an R-DCCH, upon joining an active group. When the group activity ends, there is no need for the member subscriber stations to transmit control data, therefore after a predetermined period of group call inactivity, the member subscriber stations release the reverse link channel and start monitoring a different reverse link channel used for an access of the communication system. In one embodiment, the member subscriber station monitors a reverse access channel (R-ACH) or a reverse enhanced access channel (R-EACH). Consequently, when a member subscriber station in an active group call with inactivity not exceeding the predetermined period needs to transmit user data, a control data signaling message is sent over the R-DCCH from the member subscriber station to a sector. If the member subscriber station has released the R-DCCH, the member subscriber station sends a control data signaling message on the R-ACH or the R-EACH.

In one embodiment, the control data signaling message is a request for permission to transmit. Upon receiving the request, the sector issues the permission to transmit via a forward link channel that the member subscriber station monitors. As described above, when the silent period exceeds a predetermined interval, the member subscriber stations cease monitoring the forward link shared channel, and the control/signaling forward link channels if monitored, and start monitoring a determined forward link channel, thus transitioning into a dormant state. Therefore, if there were recent group activities not exceeding the predetermined period of inactivity, the member subscriber station is monitoring the forward link shared channel or the control/signaling forward link channels; consequently, the permission is issued on the forward link shared channel or the control/signaling forward link channels. If the member subscriber stations released the forward link shared channel and the control/signaling forward link channels, the permission is issued on the forward link channel monitored by the member subscriber stations. In this case, all member subscriber stations must be further sent a signaling message to start monitoring the forward link shared channel at their sectors and the control/signaling forward channel if such channel is used.

The reverse link transmission may proceed on the reverse link channel, e.g., the R-DCCH, once the member subscriber station receives the permission to use the R-DCCH. Alternatively, the reverse link channel assigned for the communication may comprise, e.g., a Reverse Common Control Channel (R-CCCH), a Reverse Fundamental Channel (R-FCH), or a Reverse Supplemental Channel (R-SCH).

The assignment of the R-SCH can be infinite. The assignment is revoked when the member subscriber station informs the sector through the R-DCCH that the communication is over, or when the sector detects cessation of the transmission from the member subscriber station for a predetermined amount of time. The base station can then assign the R-SCH to another member subscriber station desiring to transmit to the group. Because there is at most one member subscriber station transmitting at any given moment, there will be at most one R-SCH in all sectors containing active member subscriber stations to support a group call.

As discussed, in one embodiment the member subscriber stations are not assigned individual R-DCCHs, but use the R-EACH for reverse link signaling and communication when needed. Consequently, the request for permission to transmit is sent using the R-EACH or an R-EACH and R-CCCH. The R-EACH or the R-EACH/R-CCCH are used in the basic access, reservation access, and power control access mode as defined in the IS-2000 standard.

Upon receiving the request, the base station assigns the member subscriber station an R-FCH, an R-DCCH, an R-CCCH, or an R-SCH, and issues permission to start transmission through the forward channel that the member subscriber station monitors. Therefore, if there were recent group activities and the member subscriber station is monitoring the forward link broadcast channel, the permission is issued on the forward link broadcast channel, e.g., the F-SCH, F-CCCH/F-BCCH, or the F-DCCH monitored by the member subscriber station. If the member subscriber stations released the forward link shared channel or the F-DCCH, the permission is issued on a F-PCH a F-CCCH. In this case all member subscriber stations must further be send a signaling message to start monitoring the forward link broadcast channel at their sectors and a control/signaling forward channel if such channel is used.

If the member subscriber station desiring to transmit is granted an R-FCH or a R-DCCH, the procedures of set-up and release of the R-FCH or the R-DCCH in accordance with the IS-2000 standard apply. Signaling between the active member subscriber station and the system takes place on the assigned R-FCH or the R-DCCH, or the R-EACH/F-CCCH.

If the member subscriber station desiring to transmit is granted an R-CCCH, the R-CCCH may be exclusively assigned to the member subscriber station by the sector for a predetermined duration to avoid conflicts with other member subscriber stations, or the R-CCCH can be shared to improve efficiency.

If the member subscriber station desiring to transmit is granted an R-SCH, the R-SCH is exclusively assigned to a member subscriber station by the sector for a predetermined duration. For user data transmission, the assignment of the R-SCH can be infinite. The assignment terminates when the member subscriber station informs the sector over R-EACH that the segment of conversation is over, or when the sector detects no more transmission from the member subscriber station. The sector can then assign another member subscriber station to transmit on the R-SCH.

Alternatively, transmissions to the group shorter than a threshold occur on the R-EACH without request-permission exchanges. Basic access, reservation access, and power control access are three exemplary embodiments for the use of these channels, and are defined in the IS-2000 standard. In this embodiment, transmissions to the group longer than the threshold from a member subscriber station need to follow the request-permission exchange.

In the above-described embodiment, the member subscriber station must send a request and receive permission before the member subscriber station may start transmission on the assigned reverse link channel. The channel assignment and permission to transmit are not necessary two distinct requests. The reverse channel assignment occurs at the lower layer, e.g., a sector, and the permission to transmit at a higher layer, e.g., a group call manager. Therefore, in one embodiment, the member subscriber station may start transmission upon channel assignment, which implies that a permission to transmit has been given.

Silent Period Determination

To reduce capacity waste, member subscriber stations are only assigned to forward link shared channels during active group calls. Therefore, the sectors and the member subscriber stations must be able to determine the beginning of a silent period. The term silent period is used herein to identify the dormant or the idle state. The silent period begins, e.g., because no more requests for transmission to the group exist for a pre-determined interval or because pre-arranged schedule for the group call expired. In one embodiment, the decision is made by the access network, and is communicated to the member subscriber stations. Alternatively, the member subscriber station determines the start of the silent period from a long period of inactivity and transition into a dormant/idle mode autonomously, with or without notifying the sector. In another alternative embodiment, the member subscriber stations as well as the access network transition into the silent period based on individual schedules.

Once the beginning of a silent period is determined, the member subscriber station transfers to a slotted mode of operation, only periodically monitoring the group call associated common channels or the common channels associated Quick Paging Channels (QPCHs) that can be optionally provided.

Alternatively, the member subscriber station transitions to paging channels that the member subscriber station would monitor regularly (the F-PCH, or the combination of the F-CCCH and the F-BCCH, each with optionally associated QPCH).

If the member subscriber stations are monitoring the F-SCH and the F-DCCH in the active period, the member subscriber stations monitor the F-DCCH in the silent period.

In a third alternative embodiment, the control entity via a sector assigns the member subscriber station to monitor the group call-associated F-CCCH(s) and F-BCCH(s) for the group activities and another F-CCCH or an F-CCCH/F-BCCH pair for regular paging and messaging.

In a fourth alternative embodiment, the control entity via a sector assigns the member subscriber station to monitor a set of F-CCCH(s) and F-BCCH(s) for the group activities, an F-CCCH for regular paging, a QPCH associated with the regular-paging F-CCCH, and an F-BCCH for point-to-multipoint service signaling. A member subscriber station continuously monitors the group F-CCCH(s) and F-BCCH(s), as well as the F-BCCH and the assigned positions (called Paging Indicator in IS-2000) on the QPCH for that member subscriber station to decide whether there is a need to also monitor its assigned regular-paging F-CCCH.

Active Period Notification

Once an active period begins, the member subscriber station is notified through messages transmitted on forward link channels monitored by the member subscriber station in the silent period.

In one embodiment, the forward link channels used for each of the member subscriber stations in active state are forward common control channel(s) (F-CCCH), forward broadcast common channel (F-BCCH), or both the F-CCCH and the F-BCCH.

In one embodiment, all F-CCCHs and F-BCCHs are shared by the member subscriber stations for the group calls and by non-members for their paging needs in a given sector. This is achieved by having proper addressing information in the transmission on these forward link channels.

In another embodiment, some F-CCCHs and F-BCCHs in a sector are designated exclusively for group call purposes, and the remaining F-CCCHs and F-BCCHs designated exclusively for paging of the non-member subscriber stations.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter, a receiver and any other appropriate blocks of the AT and/or AP.

Those of ordinary skills in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for channel management in a communication system, comprising:
    assigning at a base station at least one forward link shared channel during an active period to subscriber stations belonging to a group;
    assigning at least one forward link channel during a silent period to each of the subscriber stations; and
    transitioning between the at least one forward link shared channel and the at least one forward link channel when the periods switch as determined by communication activity on the at least one forward link shared channel among the subscriber stations belonging to the group.

2. The method as claimed in claim 1, wherein said assigning at least one forward link channel during a silent period to the subscriber stations comprises:
    assigning at least one forward link channel during a silent period to the subscriber stations; the at least one forward link channel being modulated by information pertaining to point-to-point services and point-to-multipoint services.

3. The method as claimed in claim 1, wherein said assigning at least one forward link channel during a silent period to the subscriber stations comprises:
    assigning at least one forward link channel being modulated by information pertaining to point-to-point services; and
    assigning at least one forward link channel being modulated by information pertaining point-to-multipoint services.

4. The method as claimed in claim 1, wherein said assigning at least one forward link shared channel during an active period to subscriber stations belonging to a group comprises:
    assigning at least one forward link shared channel during an active period to subscriber stations belonging to a group; the forward link shared channel being modulated by user data and control data.

5. The method as claimed in claim 1, further comprising:
    assigning a forward link dedicated channel during an active period to each of the subscriber stations.

6. The method as claimed in claim 5, wherein said assigning at least one forward link shared channel during an active period to subscriber stations belonging to a group comprises:
    assigning at least one forward link shared channel during an active period to subscriber stations belonging to a group; the forward link shared channel being modulated by user data; and
    wherein assigning a forward link dedicated channel during an active period to each of the subscriber stations comprises:
    assigning a forward link dedicated channel during an active period to each of the subscriber stations; the forward link dedicated channel being modulated by control data.

7. A method for channel management in a communication system, comprising:
    assigning at a base station at least one reverse link dedicated channel to an active subscriber station belonging to a group;

assigning at least one reverse link common channel to a passive subscriber station belonging to a group; and transitioning between the at least one reverse link dedicated channel and the at least one reverse link common channel when a status of the subscriber station switches between active and passive as determined by communication activity on the at least one reverse link common channel among the subscriber stations belonging to the group.

8. The method as claimed in claim 7, further comprising:
modulating the at least one reverse link dedicated channel by user data and control data.

9. The method as claimed in claim 7, further comprising:
modulating the at least one reverse link common channel by control data.

10. The method as claimed in claim 7, further comprising:
modulating the at least one reverse link common channel by a request for a reverse link channel assignment; and
modulating the assigned reverse link channel by control data.

11. An apparatus for channel management in a communication system, comprising:
means for assigning at least one forward link shared channel during an active period to subscriber stations belonging to a group;
means for assigning at least one forward link channel during a silent period to each of the subscriber stations; and
means for transitioning between the at least one forward link shared channel and the at least one forward link channel when the periods switch as determined by communication activity on the at least one forward link shared channel among the subscriber stations belonging to the group.

12. The apparatus as claimed in claim 11, wherein said means for assigning at least one forward link channel during a silent period to the subscriber stations comprises:
means for assigning at least one forward link channel during a silent period to the subscriber stations; the at least one forward link channel being modulated by information pertaining to point-to-point services and point-to-multipoint services.

13. The apparatus as claimed in claim 11, wherein said means for assigning at least one forward link channel during a silent period to the subscriber stations comprises:
means for assigning at least one forward link channel being modulated by information pertaining to point-to-point services; and
means for assigning at least one forward link channel being modulated by information pertaining point-to-multipoint services.

14. The apparatus as claimed in claim 11, wherein said means for assigning at least one forward link shared channel during an active period to subscriber stations belonging to a group comprises:
means for assigning at least one forward link shared channel during an active period to subscriber stations belonging to a group; the forward link shared channel being modulated by user data and control data.

15. The apparatus as claimed in claim 11, further comprising:
means for assigning a forward link dedicated channel during an active period to each of the subscriber stations.

16. The apparatus as claimed in claim 15, wherein said means for assigning at least one forward link shared channel during an active period to subscriber stations belonging to a group comprises:

means for assigning at least one forward link shared channel during an active period to subscriber stations belonging to a group; the forward link shared channel being modulated by user data; and wherein means for assigning a forward link dedicated channel during an active period to each of the subscriber stations comprises:
means for assigning a forward link dedicated channel during an active period to each of the subscriber stations; the forward link dedicated channel being modulated by control data.

17. An apparatus for channel management in a communication system, comprising:
means for assigning at least one reverse link dedicated channel to an active subscriber station belonging to a group;
means for assigning at least one reverse link common channel to a passive subscriber station belonging to a group; and
means for transitioning between the at least one reverse link dedicated channel and the at least one reverse link common channel when a status of a subscriber station switches between active and passive as determined by communication activity on the at least one reverse link common channel among the subscriber stations belonging to the group.

18. The apparatus as claimed in claim 17, further comprising:
means for modulating the at least one reverse link dedicated channel by user data and control data.

19. The apparatus as claimed in claim 17, further comprising:
means for modulating the at least one reverse link common channel by control data.

20. The apparatus as claimed in claim 17, further comprising:
means for modulating the at least one reverse link common channel by a request for a reverse link channel assignment; and
means for modulating the assigned reverse link channel by control data.

21. An apparatus for channel management in a communication system, comprising:
a control unit at an access network configured to:
assign at least one forward link shared channel during an active period to subscriber stations belonging to a group;
assign at least one forward link channel during a silent period to the subscriber stations; and
transition between the at least one forward link shared channel and the at least one forward link channel when the period switches as determined by communication activity on the at least one forward link shared channel among the subscriber stations belonging to the group; and
a sector communicatively coupled to said control unit, configured to transmit information about the assignment.

22. The apparatus as claimed in claim 21, wherein said control unit is configured to assign at least one forward link channel during a silent period to the subscriber stations, the at least one forward link channel being modulated by information pertaining to point-to-point services and point-to-multipoint services.

23. The apparatus as claimed in claim 21, wherein said control unit assigns at least one forward link channel during a silent period to the subscriber stations by being configured to:

assign at least one forward link channel being modulated by information pertaining to point-to-point services; and assign at least one forward link channel being modulated by information pertaining point-to-multipoint services.

24. The apparatus as claimed in claim 21, wherein said control unit assigns at least one forward link shared channel during an active period to subscriber stations belonging to a group by being configured to:

assign at least one forward link shared channel during an active period to subscriber stations belonging to a group; the forward link shared channel being modulated by user data and control data.

25. The apparatus as claimed in claim 21, wherein said control unit is further configured to assign a forward link dedicated channel during an active period to each of the subscriber stations.

26. The apparatus as claimed in claim 25, wherein said control unit assigns at least one forward link shared channel during an active period to subscriber stations belonging to a group by being configured to:

assign at least one forward link shared channel during an active period to subscriber stations belonging to a group; the forward link shared channel being modulated by user data; and wherein said control unit assigns a forward link dedicated channel during an active period to each of the subscriber stations by being configured to:

assign a forward link dedicated channel during an active period to each of the subscriber stations;

the forward link dedicated channel being modulated by control data.

27. An apparatus for channel management in a communication system, comprising:

a control unit at an access network configured to:

assign at least one reverse link dedicated channel to an active subscriber station belonging to a group;

assign at least one reverse link common channel to a passive subscriber station belonging to the group; and transition between the at least one reverse link dedicated channel and the at least one reverse link common channel when a status of a subscriber station switches between active and passive as determined by communication activity on the at least one reverse link common channel among the subscriber stations belonging to the group; and a sector communicatively coupled to said control unit, configured to transmit information about the assignment.

28. The apparatus as claimed in claim 27, further comprising:

an active subscriber station belonging to the group configured to modulate the at least one reverse link dedicated channel by user data and control data.

29. The apparatus as claimed in claim 27, further comprising:

a passive subscriber station belonging to the group configured to modulate the at least one reverse link common channel by control data.

30. The apparatus as claimed in claim 27, further comprising:

a passive subscriber station belonging to the group configured to:

modulate the at least one reverse link common channel by a request for a reverse link channel assignment; and modulate the assigned reverse link channel by control data.

31. A processor-readable storage medium including processor-executable instructions encoded thereon for performing a method for channel management in a communication system, the method comprising:

assigning at a base station at least one forward link shared channel during an active period to subscriber stations belonging to a group;

assigning at least one forward link channel during a silent period to each of the subscriber stations; and transitioning between the at least one forward link shared channel and the at least one forward link channel when the periods switch as determined by communication activity on the at least one forward link shared channel among the subscriber stations belonging to the group.

32. A processor-readable storage medium including processor-executable instructions encoded thereon for performing a method for channel management in a communication system, the method comprising;

assigning at a base station at least one reverse link dedicated channel to an active subscriber station belonging to a group;

assigning at least one reverse link common channel to a passive subscriber station belonging to a group; and transitioning between the at least one reverse link dedicated channel and the at least one reverse link common channel when a status of the subscriber station switches between active and passive as determined by communication activity on the at least one reverse link common channel among the subscriber stations belonging to the group.

* * * * *